Patented Aug. 20, 1940

2,211,947

UNITED STATES PATENT OFFICE 2,211,947

PYRIDINE DERIVATIVES

Isidor Morris Heilbron, London, Donald Holroyde Hey, Tadworth, and John Wynne Haworth, Manchester, England, assignors to Imperial Chemical Industries Limited, a corporation of Great Britain No Drawing. Application November 14, 1939, Serial No. 304,410. In Great Britain October 25, 1938

7 Claims. (Cl. 260—295)

An object of our present invention is to provide new pyridine derivatives. A further object is to provide derivatives of phthalic acid substituted by the pyridyl group. Other objects of our invention will be apparent from the following description.

These objects may be accomplished in accordance with our invention which comprises effecting interaction between pyridine and a member of the group consisting of a diazotised aminophthalonitriles, aminophthalimides and aminophthalic dialkyl esters.

The interaction is brought about by mixing together the diazo compound and the pyridine, conveniently by adding an aqueous solution of the diazo compound to the pyridine. Nitrogen is evolved and the new compounds are formed by substitution in the pyridine nucleus.

The diazo compound can also be employed, if desired, in the form of a stable salt. Thus there may be taken for this purpose the naphthalene $\beta$-sulphonate of the diazo compound. The pyridine it is advantageous to use in excess of that theoretically needed for the reaction. Some of this excess can, however, be recovered.

The new compounds obtained by the process of the present invention, namely pyridyl phthalonitriles, pyridyl phthalimides and pyridyl dialkyl phthalates, are useful as dyestuff intermediates. Pyridyl phthalic acids may also be obtained indirectly by the hydrolysis of pyridyl phthalonitriles pyridyl phthalimides or pyridyl phthalic esters made by the process already described.

The interaction between the pyridine and the diazotised aminophthalic acid derivative according to the process of this invention appears to take place in such a way that the phenyl nucleus of the aminophthalic acid derivative becomes attached to the pyridine nucleus partly in the $\alpha$-, partly in the $\beta$- and partly in the $\gamma$-position. Thus it comes about that the products obtained consist of a mixture of isomers, namely, $\alpha$-, $\beta$- and $\gamma$-isomers. For example, the 4-pyridyl phthalonitrile (M. P. 136–8° C.) of Example 1 (below) is a mixture of 4-$\alpha$-pyridylphthalonitrile together with the corresponding $\beta$- and $\gamma$-isomers. Separation may be effected by fractional precipitation from hydrochloric acid solution by the gradual addition of aqueous sodium hydroxide. By this means it is possible to isolate 4-$\alpha$-pyridylphthalonitrile and 4-$\beta$-pyridylphthalonitrile from the mixed isomers. After repeated crystallisation from ethyl alcohol these compounds melt at 169° C. ($\alpha$-isomer) and 196–7° C. ($\beta$-isomer).

The invention is illustrated but not limited by the following examples in which the parts are by weight.

Example 1

108 parts of 4-aminophthalonitrile (obtained by reducing 4-nitrophthalonitrile) are dissolved in 400 parts of water and 472 parts of aqueous hydrochloric acid, sp. gr. 1.18. The solution is cooled to about 5° C. and 52 parts of sodium nitrite dissolved in 400 parts of water are slowly added.

The aqueous solution of diazo compound thus obtained is run slowly into 800 parts of pyridine which is kept at 30–35° C. and is well stirred. Nitrogen is evolved and a pale brown finely divided solid is precipitated. When no more gas is given off the precipitate is filtered off, washed with water and dried. This substance may be purified when necessary by dissolving it in a sufficiency of benzene, and adding petroleum spirit (B. P. 40–60° C.) to the solution to reprecipitate it.

The substance so obtained consists of a mixture of pyridyl phthalonitriles and can be represented by the formula $C_5H_4N$—$C_6H_3(CN)_2$, the linkage with the pyridyl group being in the alpha-, beta-, or gamma-position in the pyridine ring.

Example 2

To 40.5 parts of 4-aminophthalimide, suspended in a mixture of 200 parts of water and 72 parts of sulphuric acid (sp. gr. 1.84) at 0–5° C., a solution of 17.2 parts of sodium nitrite in 100 parts of water is added.

The aqueous solution of diazo compound thus obtained is run into 400 parts of pyridine at about 40° C. as described in Example 1. The mixture is warmed to 70–75° C. to bring the reaction to completion. When no more gas is evolved the liquid is run into 2000 parts of cold water. 4-pyridylphthalimide (mixture) is precipitated. It is filtered off, washed with water and dried.

Example 3

20.3 parts of 3-aminophthalimide are mixed to form a smooth paste with hot dilute sulphuric acid obtained by mixing 200 parts of water and 168 parts of sulphuric acid (sp. gr. 1.84). This paste of the sulphate of 3-aminophthalimide is cooled to 0–5° C. and diazotised by the gradual addition of 8.6 parts of sodium nitrite in 60 parts of water.

The aqueous solution of the diazo compound is run into 200 parts of pyridine at 40–45° C. during 1–2 hours. Nitrogen is evolved. The reaction mixture is then warmed to 70–75° C. to complete the reaction. The product is isolated as in Example 2. 3-pyridylphthalimide (mixture of α, β and γ isomers) is obtained as a light buff powder, soluble in hydrochloric acid and also in sodium hydroxide solution.

Example 4

40.5 parts of 4-aminophthalimide are diazotised as described in Example 2 and added as quickly as possible, with stirring, to a solution of 58 parts of sodium naphthalene β-sulphonate, dissolved in 700 parts of water and the mixture cooled to 5–10° C. The bright yellow precipitate of the diazonium β-naphthalene sulphonate is filtered off and the paste so obtained added portionwise, with stirring, to 200 parts of pyridine at 60° C. Each addition is accompanied by evolution of nitrogen and the mixture becomes reddish-brown in colour. The reaction is completed by heating at 60–70° C. and 4-pyridylphthalimide (isomeric mixture) precipitated by dilution with water. The light reddish brown precipitate is filtered off, washed with water and dried. The product is similar to that obtained in Example 2.

Example 5

38 parts of 4-aminodiethylphthalate is dissolved in 95 parts of hydrochloric acid (sp. gr. 1.18) and 8 parts of water and the solution cooled to 0–5° C. 13 parts of sodium nitrite dissolved in 50 parts of water are added gradually. The resulting diazo solution is then added slowly to 800 parts of pyridine at 50° C. When the evolution of nitrogen ceases the mixture is made neutral to litmus with sodium hydroxide solution and the excess of pyridine removed by steam distillation. The residual oily layer is dissolved in benzene and the benzene layer separated and distilled in vacuo. Diethyl 4-pyridyl phthalate (isomeric mixture) is obtained as a clear yellow oil B. P. 130°/0.01 mm. It is hydrolysed by heating with aqueous sodium hydroxide to 4-pyridyl phthalic acid.

As many apparently widely different embodiments of this invention may be made without departing from the spirit and scope thereof, it is to be understood that we do not limit ourselves to the specific embodiment except as defined in the appended claims.

We claim:

1. Process for the manufacture of new pyridyl phthalic acid derivatives comprising mixing together an excess of pyridine and a diazo compound selected from the group consisting of diazotized aminophthalonitriles, aminophthalimides and aminophthalic dialkyl esters, and causing a reaction between the pyridine and the diazo compound, with evolution of nitrogen.

2. Process for the manufacture of new pyridyl phthalic acid derivatives comprising mixing together an excess of pyridine and an aqueous solution of a diazo compound selected from the group consisting of diazotized aminophthalonitriles, aminophthalimides and aminophthalic dialkyl esters, and causing the mixture to assume an elevated temperature, ont exceeding 75° C., whereby a reaction is brought about between the pyridine and the diazo compound, with evolution of nitrogen.

3. Process for the manufacture of new pyridyl phthalic acid derivatives comprising mixing together an excess of pyridine and diazotized 4-aminophthalonitrile, and causing a reaction between the pyridine and the diazo compound, with evolution of nitrogen.

4. An organic compound of the general formula A—B, wherein A is the radical of pyridine while B is a radical of the group consisting of phthalonitrile, phthalimide, phthalic acid and a dialkyl phthalate, the two radicals being joined to each other by a single bond connecting a carbon atom in the pyridine radical to a carbon atom in the isocyclic nucleus of the other radical.

5. An organic compound of the general formula

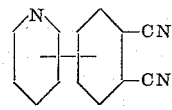

wherein the bond between the nuclei runs from a carbon atom in the pyridine ring to a carbon atom in the benzene ring of the other radical.

6. An organic compound of the general formula

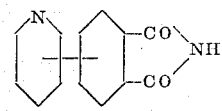

wherein the bond between the nuclei runs from a carbon atom of the pyridine ring to a carbon atom in the benzene ring of the phthalimide.

7. An organic compound of the general formula

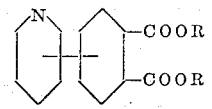

wherein R stands for a member of the group consisting of hydrogen and lower alkyl, and wherein the bond between the nuclei runs from a carbon atom of the pyridine ring to a carbon atom in the benzene ring of the other radical.

ISIDOR MORRIS HEILBRON.
DONALD HOLROYDE HEY.
JOHN WYNNE HAWORTH.